(12) United States Patent
Lucht et al.

(10) Patent No.: US 7,694,908 B2
(45) Date of Patent: Apr. 13, 2010

(54) SAFETY BELT RETRACTOR WITH A SELECTIVELY ACTIVATABLE SHOCK ABSORBER

(75) Inventors: Andreas Lucht, Horst (DE); Geert Helge Wittenburg, Norderstedt (DE); Frank Matzen, Hamburg (DE); Erik Ziel, Quickborn (DE)

(73) Assignee: Autoliv Development AB (SE)

( * ) Notice: Subject to any disclaimer, the term of this patent is extended or adjusted under 35 U.S.C. 154(b) by 978 days.

(21) Appl. No.: 10/504,035

(22) PCT Filed: Feb. 1, 2003

(86) PCT No.: PCT/EP03/00996

§ 371 (c)(1),
(2), (4) Date: Nov. 14, 2006

(87) PCT Pub. No.: WO03/066391

PCT Pub. Date: Aug. 14, 2003

(65) Prior Publication Data

US 2007/0095965 A1      May 3, 2007

(30) Foreign Application Priority Data

Feb. 7, 2002    (DE) .............................. 102 04 927

(51) Int. Cl.
*B60R 22/28* (2006.01)
*B60R 22/34* (2006.01)
*B60R 22/46* (2006.01)

(52) U.S. Cl. ..................... 242/381; 242/374; 242/379.1

(58) Field of Classification Search ................ 242/374, 242/390.8, 390.9, 379.1, 381, 396; 280/805, 280/807; 297/470, 475–478; 188/290, 291, 188/293, 296

See application file for complete search history.

(56) References Cited

U.S. PATENT DOCUMENTS

| 3,144,921 | A | * | 8/1964 | Martinek | .................... 192/21.5 |
| 3,848,828 | A | * | 11/1974 | Kuhl | ........................ 242/379.1 |
| 4,815,674 | A | * | 3/1989 | Blake et al. | .................. 242/384 |
| 5,285,872 | A | * | 2/1994 | Kaneda | ...................... 188/71.5 |

(Continued)

FOREIGN PATENT DOCUMENTS

EP      1 060 961      12/2000

(Continued)

*Primary Examiner*—John Q Nguyen
*Assistant Examiner*—Scott Haugland
(74) *Attorney, Agent, or Firm*—Robert W. Becker; Robert Becker & Assoc.

(57) ABSTRACT

A safety belt retractor, especially in vehicles, is provided that includes a belt shaft as a carrier for a belt that is wound thereon and a vehicle sensitive and/or belt sensitive controllable block device for the belt shaft. The block device includes a force limiting device, effective in the event of a block event, the force limiting device having a viscous medium-filled housing with at least one fixedly positioned contour and a counter-contour that is rotatably displaceable in response to a block event, so that the relative movement between the contour and the counter-contour forces the viscous medium between the surfaces arranged for this purpose. The level of the force limitation applied by the force limitation device is adjustably settable as a function of the parameters associated with the buckled-in passengers via a variation of the inner pressure in the viscous medium-filled housing.

7 Claims, 3 Drawing Sheets

U.S. PATENT DOCUMENTS

| | | | | |
|---|---|---|---|---|
| 5,573,088 A | * | 11/1996 | Daniels | 188/267 |
| 5,618,006 A | * | 4/1997 | Sayles | 242/379.1 |
| 5,785,269 A | * | 7/1998 | Miller et al. | 242/379.1 |
| 5,788,177 A | * | 8/1998 | Keller et al. | 242/379.1 |
| 5,924,641 A | * | 7/1999 | Keller et al. | 242/379.1 |
| 5,967,442 A | * | 10/1999 | Wier | 242/379.1 |
| 6,012,667 A | * | 1/2000 | Clancy et al. | 242/379.1 |
| 6,045,076 A | * | 4/2000 | Daniels | 242/287 |
| 6,216,972 B1 | * | 4/2001 | Rohrle | 242/379.1 |
| 6,290,159 B1 | * | 9/2001 | Specht et al. | 242/379.1 |
| 6,659,505 B1 | * | 12/2003 | Knox | 280/806 |
| 6,663,038 B2 | * | 12/2003 | Juchem et al. | 242/381 |
| 6,705,559 B1 | * | 3/2004 | Sullivan et al. | 242/381 |
| 2001/0032902 A1 | * | 10/2001 | Specht | 242/374 |
| 2001/0048043 A1 | * | 12/2001 | Sauder et al. | 242/381 |

FOREIGN PATENT DOCUMENTS

| | | |
|---|---|---|
| WO | WO 97/49583 | 12/1997 |
| WO | WO01/58728 | 8/2001 |

* cited by examiner

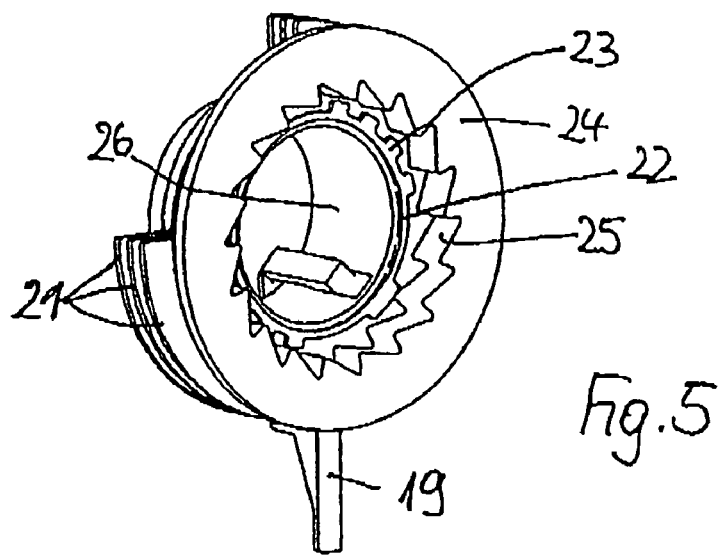
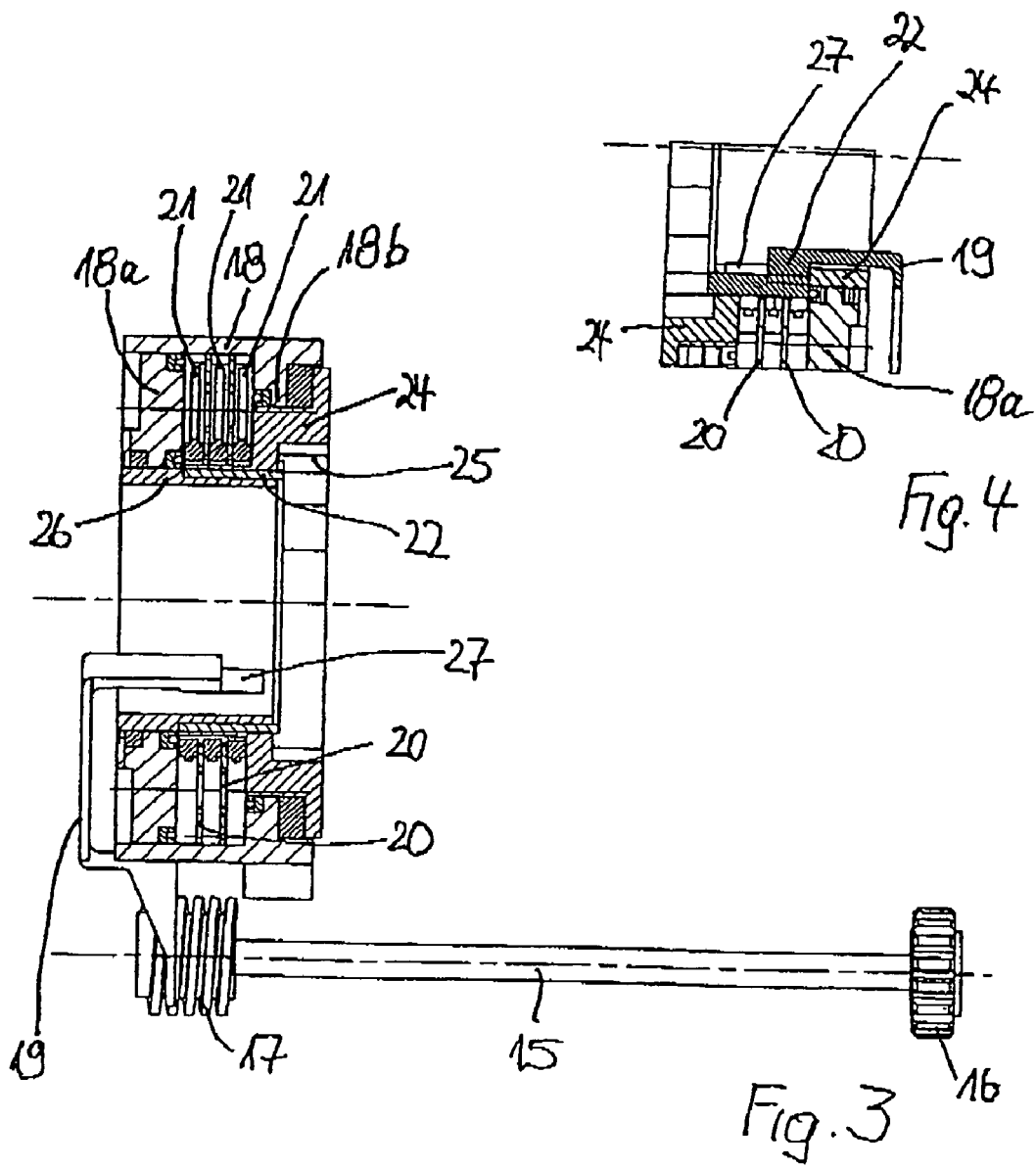
Fig. 5
Fig. 4
Fig. 3

SAFETY BELT RETRACTOR WITH A SELECTIVELY ACTIVATABLE SHOCK ABSORBER

BACKGROUND OF THE INVENTION

The invention relates to a safety belt retractor, especially in vehicles, with a belt shaft as a carrier for the belt that is wound thereon as well as a vehicle sensitive and/or belt sensitive controllable block device for the belt shaft, and with a force limiting device, effective in the event of a block event, that is comprised of a viscous medium-filled housing with at least one fixedly positioned contour and a counter-contour that is rotatably displaceable in response to a block event, so that the relative movement between the contour and the counter-contour forces the medium between the surfaces arranged for this purpose.

A safety belt retractor with the above-described features is described in WO 01/58728 A1. With respect to this known belt retractor, the cylindrical housing of the force limiting device is connected to the outer side of the belt retractor housing and is coupled with the belt shaft or, respectively, in particular, with a torsion rod. In one embodiment, in the housing of the force limiting device that is filled with a viscous medium that is, in particular, silicone, there is arranged a succession of fixedly positioned disks between which the ring pistons, configured to dampen the belt shaft or, respectively, to dampen the torsion rod via their rotational movement, grip, with a piston blade radially spaced from its respective ring piston, the disks. During relative movement between the ring pistons and the disks, the silicone is forced between the ring pistons so that the targeted force consumption and, consequently, the force limitation, occurs.

With the known safety belt retractor or, respectively, its force limitation, there is, independent of the respective constructive configuration relative to that described in WO 01/58728 A1, a disadvantage in that its force limitation device cannot be selectively adjusted to different passenger parameters. While it is known that such liquid dampeners react to different crash impulses with a variation of the applied limitation force, a response tailored to the different masses of individual passengers has heretofore not been possible. Accordingly, it is desirable, with respect to large, heavy passengers, to adjustably set the limitation force to a high limit to prevent, for example, in the event of an inflation of an airbag built into the vehicle, a blow to the airbag and, thus, a corresponding risk of injury to the passengers. In the event, on the other hand, that a smaller, lighter person is buckled in with the safety belt, the limitation forces can be adjustably set to lower limits.

SUMMARY OF THE INVENTION

The invention solves the task of configuring a force limitation device of the type provided on a safety belt retractor with the limiting force of the state-of-the-art features of the force limitation device its force limitation arranged with the capability to be adjustably set.

The invention provides in a first embodiment that the level of the force limitation can be adjustably set as a function of the parameters associated with the passengers buckled in by the safety belt unwound from the belt shaft by a variation of the inner pressure in the housing filled with a viscous medium, whereby an increase in the limitation force applied by the force limitation device is the response to an active increase of the inner pressure in the housing. The inner pressure is, thus, controlled in correspondence with the parameter values of the buckled in passenger in that it is controlled as a function of the standards that are made available by the measurement systems correspondingly provided in the vehicle.

In accordance with an alternative embodiment of the invention, it can be provided that, for the purpose of varying the inner pressure, either one of the expansion tanks filled with a viscous medium and connected to the housing operates in cooperation with a pump disposed intermediate the expansion tank and the housing that is controlled as a function of the parameter data, or that a housing wall in the housing is configured to be actively displaceable by means of a drive.

In a second embodiment, the invention embodies a force limitation device whose state-of-the art constructive configuration is that described in WO 01/58728 and which comprises fixedly positioned disks in a housing that is filled with a viscous medium and a plurality of ring pistons arranged between the disks and connected to the belt shaft for rotation therewith. To adjustably set the limitation force, it is provided, in accordance with the invention, that the level of the force limitation is adjustable, as a function of the parameters associated with the passengers buckled in by the safety belt unwound from the belt shaft, via activating and de-activating the ring pistons on the belt shaft by means of a switch device disposed between the belt shaft and the ring pistons.

To put into practice the switch capability, it is provided, in accordance with an embodiment of the invention, that the switch device is comprised of a switch ring that is couplable to the belt shaft and that is, by means of a drive, axially displaceable in the housing of the force limitation device, the switch ring being connected, as a function of its switch position, with one or more of the ring pistons in a manner in which the switch ring and the respective ring piston or ring pistons with which it is connected moving together with one another, whereby it can be provided that the drive impacts a transmission lever, coupled to the switch ring, that is axially guided on, and extends from, the housing of the force limiting device.

In accordance with individual details, it can be provided that the switch ring forms the inner circumferential wall of the annularly-shaped housing of the force limitation device and is engaged from underneath by a projection of the belt shaft that covers and guides the switch ring. This configuration offers the advantage that the housing filled with a viscous medium is sealed off by the switch ring and the projection of the belt shaft that covers the switch ring.

In this connection, the projection of the belt shaft can, on the one hand, be a direct component of the belt shaft whose rotational movement is to be dampened. On the other hand, it can also be provided that the projection is a component of an isolated or separate central shaft that is rotatably supported relative to the housing of the force limitation device and that is capable of being coupled, in response to a belt-tightening event, with the belt shaft; this configuration is traceable to the principle of the interconnection of the force limitation device to the belt shaft in accordance with which the belt shaft, during its normal operation, is not coupled with the force limitation device and is only, upon the occurrence of a belt tightening event, to be coupled, in the manner of a known block system of a self-blocking belt retractor, with the central shaft that itself is provided as a component of the force limiting device, such coupling being effected via a radially deflectable toothed disk operating as a coupling member.

It can be provided that the transmission lever penetrates through the projection via a slot therein and is fixedly connected to the switch ring.

In accordance with an embodiment of the invention, it is provided that the drive is a motor that is controlled as a function of the passenger parameters.

To the extent that the safety belt retractors are provided with a reversible belt tightening device that can be coupled to the belt shaft, the belt tightening device operates in a conventional manner in its reverse operation as a function of the passenger parameters, as a consequence of which the corresponding control values are already available. In this connection, it is provided, in accordance with an embodiment of the invention, that the drive of the belt tightening device is connectable with the transmission lever via a transmission shaft that can be coupled to the transmission lever via a coupling.

In this connection, it can be provided, in accordance with an embodiment of the invention, that the transmission shaft is provided, on the end thereof facing the force limitation device, with a worm gear, in whose worm gear course the transmission lever meshingly engages the worm gear, and is axially displaceable via rotation of the worm gear.

The invention comprises, as well, the activation and deactivation of the ring pistons on a torsion rod connected with the belt shaft, as such is described in WO 01/58728 A1.

BRIEF DESCRIPTION OF THE DRAWINGS

An embodiment of the invention is illustrated in the drawings which are described in further detail hereinafter. They show.

DESCRIPTION OF SPECIFIC EMBODIMENTS

Figure 1:
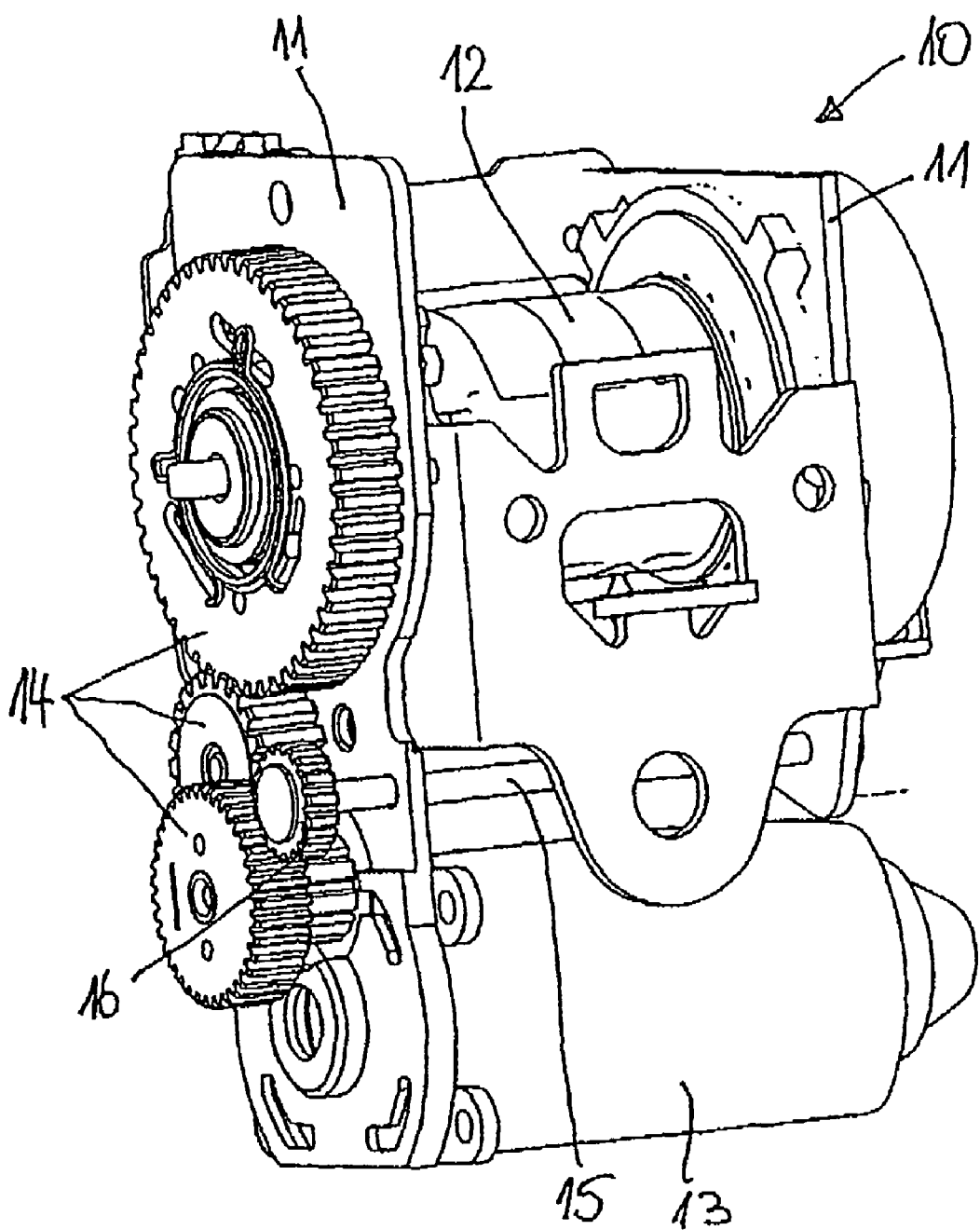
FIG. 1 a safety belt retractor with a belt tightening device and a force limitation device in a perspective view toward the belt tightening side, FIG. 2 the subject matter shown in FIG. 1, as viewed from the force limitation side, FIG. 3 the force limitation device with a drive in a sectional individual view, FIG. 4 the connection between the transmission lever and the switch ring as illustrated in FIG. 3 in an enlarged detailed view, FIG. 5 the force limitation device illustrated in FIG. 3 in a perspective view on the adjustment side.
Figure 2:
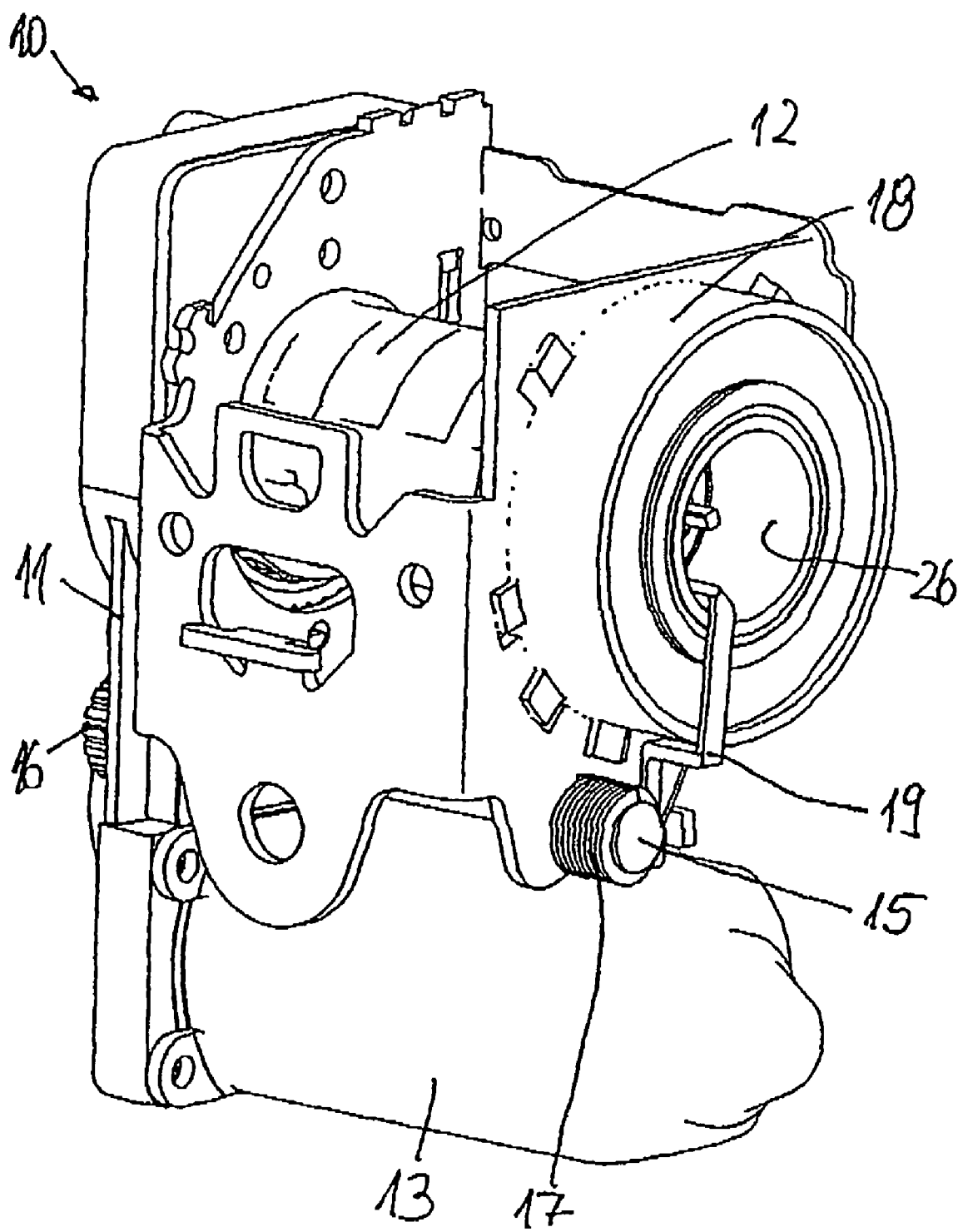

The belt retractor 10 respectively illustrated in the comprehensive views shown in FIGS. 1 and 2 has a U-shaped frame 11 in whose side shanks a belt shaft 12 is rotatably mounted. Furthermore, an electric motor 13 is flange mounted on the frame 11 of the belt retractor 10, the electric motor operating as the drive of a reversible belt tightening device whose function in individual details is not comprised as part of the subject matter of the invention and which is, in any event, conventionally known. The electric motor 13 is configured to be coupled via a drive 14 with the belt shaft 12 so that the belt tightening operation is, in detail, realized. An additionally arranged transmission shaft 15 can be already seen in FIGS. 1 and 2, the transmission shaft having on one of its ends a drive gear 16 that acts as the coupling to the drive 14 of the belt tightening device and having, on its other end, a worm gear 17 acting as the drive for the hereinafter-to-be described adjustment setting of the force limitation device. It is provided that the belt tightening device, which operates in dependence upon the parameters of a buckled in passenger, to adjustably set the force limitation device as a function of the passenger data, correspondingly sets the drive gear 16 into rotation.

The configuration of the force limitation device is shown in individual details in FIG. 3. The force limitation device comprises a housing 18 which is fixedly secured to the frame 11 of the belt retractor 10 and which comprises a rear wall 18a acting as an outer limit. The rear wall 18a of the housing 18 is disposed opposite a central shaft 24 that the opposed rear wall of the housing interior volume, together with a radial extension 18b of the housing 18 and a Z-shaped bent portion, extends inwardly and forms thereat a projection 26 extending inwardly through the annular-shaped housing 18. The central shaft is provided with a coupling tooth set 25 in which a not-illustrated blocking member which is engaged by a blocking member supported for excursion movement relative to the belt shaft 12, if the configuration comprises a belt sensitive and/or vehicle sensitive controlled blocking of the belt retractor 10.

An axially displaceable switch ring 22 is arranged between the projection 26 of the central shaft 24 and the ring pistons 21 of the force limitation device, this switch ring forming the inner circumferential wall of the housing 18. This switch ring 22 is provided with teeth 23 on its outer side which are in form lock connection with teeth formed on the inner side of the ring pistons 21 so that, upon teeth meshing engagement, the switch ring 22 and the ring pistons 21 are secured to one another for rotation together. A transmission lever 19 is arranged in an axially displaceable position on the inner side of the projection 26, the transmission lever penetrating through the projection 26 via a slot 27 thereof and being fixedly connected with the switch ring 22. An axial displacement of the transmission lever 19 thus leads to an axial displacement of the switch ring 22 so that, in connection with a displacement of the switch ring 22 toward the right in the illustration shown in FIG. 3, initially, the ring piston 21 most closely adjacent the rear wall 18a of the housing is moved out of operation with the switch ring 22 so that, upon a rotation of the central shaft 24 coupled to the belt shaft 12, only two of the ring pistons 21 are rotated therewith, whereby the limitation forces are reduced. Correspondingly, upon a still further displacement of the switch ring 22 toward the right, only one of the ring pistons 21 is rotated therewith. Correspondingly, the count or number of the ring pistons 21 arranged in the housing 18 provides for the capability to achieve further gradation of the limitation forces.

To carry out its axial displacement, the transmission lever 19 is configured as it extends out of the housing 18 of the force limitation device with a corresponding bent portion and engages in the worm gear course of the worm gear 17 of the transmission shaft 15. Thus, when the transmission shaft 15 is rotated via the electric motor 13, the transmission lever 19 is correspondingly axially displaced and correspondingly controls the switch ring 22.

The features of the subject matter of this application disclosed in the afore-noted description, the patent claims, the summary, and the drawings can be individually important as well as important in desired combinations with one another in effectuating the invention in its various embodiments.

The specification incorporates by reference the disclosure of German priority document DE 102 04 927.0 filed Feb. 7, 2002 and PCT/EP03/00996.

The present invention is, of course, in no way restricted to the specific disclosure of the specification and drawings, but also encompasses any modifications within the scope of the appended claims.

The invention claimed is:

1. A safety belt roller, comprising:
   a belt shaft as a carrier for a belt that is wound thereon; and
   a force limiting device, effective in the event of a block event, the force limiting device including a viscous medium-filled housing with a plurality of fixedly positioned disks and a plurality of ring pistons arranged between the disks and connected to the belt shaft for rotation therewith, so that relative movement between the disks and the ring pistons effects trituration of the viscous medium located between the surfaces arranged for this purpose, the level of the force limitation applied by the force limiting device being adjustably settable as a function of the parameters associated with the passengers buckled in by the safety belt unwound from the belt shaft via a variable activation and de-activation of the ring pistons on the belt shaft by means of a switch device operationally disposed between the belt shaft and the ring pistons, wherein the switch device comprises a switch ring that is coupled with the belt shaft, wherein the switch ring is displaceable axially in the housing of the force limiting device via a drive, wherein the switch ring is connected with a positive fit with one or more of the ring pistons as a function of a switch position, wherein the drive acts upon a transmission lever coupled with the switch ring, wherein the transmission lever is guided axially on the housing of the force limiting device and guided out from the housing, and wherein the transmission lever is structured to penetrate a leading projection of the belt shaft through a slot and is fixedly connected with the switch ring.

2. A safety belt retractor, comprising:

a belt shaft as a carrier for a belt that is wound thereon; and a force limiting device, effective in the event of a block event, the force limiting device including a viscous medium-filled housing with a plurality of fixedly positioned disks and a plurality of ring pistons arranged between the disks and connected to the belt shaft for rotation therewith, so that relative movement between the disks and the ring pistons effects trituration of the viscous medium located between the surfaces arranged for this purpose, the level of the force limitation applied by the force limiting device being adjustably settable as a function of the parameters associated with the passengers buckled in by the safety belt unwound from the belt shaft via a variable activation and de-activation of the ring pistons on the belt shaft by means of a switch device operationally disposed between the belt shaft and the ring pistons, wherein the switch device comprises a switch ring that is coupled with the belt shaft, wherein the switch ring is displaceable axially in the housing of the force limiting device via a drive, wherein the switch ring is connected with a positive fit with one or more of the ring pistons as a function of a switch position, wherein the drive acts upon a transmission lever coupled with the switch ring, wherein the transmission lever is guided axially on the housing of the force limiting device and guided out from the housing, and wherein the transmission lever is structured to penetrate a leading projection of the belt shaft through a slot and is fixedly connected with the switch ring.

3. A safety belt retractor according to claim 2, wherein the switch ring forms an inner circumferential wall of the housing of the force limiting device and engages with the leading projection of the belt shaft, wherein the projection covers the interior of the switch ring.

4. A safety belt retractor according to claim 3, wherein the projection is a component of a central shaft that is rotatably supported relative to the housing of the force limiting device, wherein the central shaft is coupled with the belt shaft in the event of a belt tightening event.

5. A safety belt retractor according to claim 2, wherein the drive is a motor that is controlled as a function of passenger parameters.

6. A safety belt retractor according to claim 2 with a reversible tensioning device coupled to the belt shaft, wherein a drive of the tensioning device is connected with a transmission lever via a transmission shaft that is coupled by means of a coupling.

7. A safety belt retractor according to claim 6, wherein the transmission shaft is provided with a worm gear on an end facing toward the force limiting device, wherein the transmission lever engages in a worm gear course of the worm gear, and wherein the transmission shaft is axially displaceable by the rotation of the worm gear.

* * * * *